United States Patent
Bauchot et al.

(10) Patent No.: US 7,728,728 B2
(45) Date of Patent: Jun. 1, 2010

(54) METHOD AND SYSTEMS FOR COLLECTING USER'S CHOICES USING RFIDS

(75) Inventors: Frederic Bauchot, Saint-Jeannet (FR); Jean-Yves Clement, Saint Jeannet (FR); Gerard Marmigere, Drap (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 11/475,594

(22) Filed: Jun. 27, 2006

(65) Prior Publication Data
US 2007/0069029 A1    Mar. 29, 2007

(30) Foreign Application Priority Data
Sep. 28, 2005    (EP) ................... 05108935

(51) Int. Cl.
  G08B 13/14    (2006.01)
(52) U.S. Cl. ............. 340/572.1; 340/572.8; 340/10.1; 340/505
(58) Field of Classification Search .............. 340/572.1, 340/572.4, 572.8, 10.1, 505
See application file for complete search history.

(56) References Cited

U.S. PATENT DOCUMENTS

| | | | |
|---|---|---|---|
| 6,169,483 | B1 | 1/2001 | Ghaffari et al. |
| 6,259,369 | B1 | 7/2001 | Monico |
| 6,486,783 | B1 | 11/2002 | Hausladen et al. |
| 6,851,617 | B2 | 2/2005 | Saint et al. |
| 2002/0147649 | A1 | 10/2002 | White |
| 2003/0006281 | A1 | 1/2003 | Thomas et al. |
| 2003/0058110 | A1 | 3/2003 | Rich |
| 2003/0197064 | A1 | 10/2003 | Saint |
| 2004/0002906 | A1 | 1/2004 | Von Drehnen et al. |
| 2004/0044956 | A1 | 3/2004 | Huang |
| 2004/0056823 | A1 | 3/2004 | Zuk et al. |
| 2004/0117514 | A1 | 7/2004 | Nelms et al. |
| 2004/0174257 | A1 | 9/2004 | Kuhns et al. |

(Continued)

FOREIGN PATENT DOCUMENTS

CA    2372756    11/2000

(Continued)

*Primary Examiner*—Daryl Pope
(74) *Attorney, Agent, or Firm*—George R. McGuire; David B. Woycechowsky; Bond, Schoeneck & King, PLLC (57) ABSTRACT

A method and systems for collecting data from a huge number of pre-filled forms are disclosed. According to the method and systems of the invention, the pre-filled forms comprise RFID tags, check boxes, and electrical connection between the RFID tags and the check boxes so that responses are modified according to checked boxes. In a preferred embodiment, each check box comprises at least two electrical terminals electrically connected to the RFID tag through a register. Using a pencil with conductive ink for checking the check boxes establishes an electrical contact between the terminals that modify the value of the register that in turn, modifies the response of the RFID tag. When the check boxes identifiers of a form have been collected, the identifier of the form is stored within the RFID reader to avoid further reading of the RFID tag, or the identifier of the RFID tag is erased.

20 Claims, 4 Drawing Sheets

U.S. PATENT DOCUMENTS

| | | |
|---|---|---|
| 2004/0210494 A1 | 10/2004 | White |
| 2004/0210495 A1 | 10/2004 | White |
| 2005/0092839 A1* | 5/2005 | Oram ................... 235/462.13 |
| 2005/0162686 A1* | 7/2005 | Barrus ..................... 358/1.15 |
| 2006/0007189 A1* | 1/2006 | Gaines et al. ............. 345/179 |
| 2006/0163368 A1 | 7/2006 | Fogg et al. |
| 2006/0164321 A1 | 7/2006 | Mathieu et al. |

FOREIGN PATENT DOCUMENTS

| | | |
|---|---|---|
| CA | 2385036 | 4/2001 |
| CA | 2391628 | 3/2002 |
| CA | 2484112 | 10/2003 |
| EP | 1130556 | 9/2001 |
| EP | 1130556 A1 | 9/2001 |
| EP | 1359523 | 11/2003 |
| EP | 1359523 A1 | 11/2003 |
| EP | 1393927 | 3/2004 |
| EP | 1393927 A1 | 3/2004 |
| EP | 1433124 | 6/2004 |
| EP | 1433124 A2 | 6/2004 |
| FR | 2850490 | 7/2004 |
| FR | 2855923 | 12/2004 |
| FR | 2855923 A1 | 12/2004 |
| JP | 2002319001 | 10/2002 |
| JP | 2002319001 A | 10/2002 |
| JP | 2003191668 | 7/2003 |
| JP | 2003191668 A | 7/2003 |
| JP | 2004086901 | 3/2004 |
| JP | 2004086901 A | 3/2004 |
| JP | 2004090099 A | 3/2004 |
| JP | 2005025412 | 1/2005 |
| JP | 2005025412 A | 1/2005 |
| JP | 2005025722 | 1/2005 |
| JP | 2005025722 A | 1/2005 |
| NZ | 517789 | 7/2003 |
| WO | PCT/US00/10646 | 4/2000 |
| WO | WO/00/67221 | 11/2000 |
| WO | WO/01/24109 | 4/2001 |
| WO | WO0124109 | 4/2001 |
| WO | WO/02/25584 | 3/2002 |
| WO | WO0225584 | 3/2002 |
| WO | WO/03/005295 | 1/2003 |
| WO | WO03005295 | 1/2003 |
| WO | WO03090151 | 10/2003 |
| WO | WO/2004/025554 | 3/2004 |
| WO | WO2004025554 | 3/2004 |
| WO | WO/2004/027681 | 4/2004 |
| WO | WO2004027681 | 4/2004 |
| WO | WO2004031969 | 4/2004 |
| WO | WO/2004031969 | 4/2004 |
| WO | WO/2004/080138 | 9/2004 |
| WO | WO2004080138 | 9/2004 |
| WO | WO2006007221 | 1/2006 |

* cited by examiner

Questionnaire

|  | yes | no |  | a | b | c |
|---|---|---|---|---|---|---|
| Question 1 | ☑ | ☐ | Question 6 | ☐ | ☐ | ☑ |
| Question 2 | ☑ | ☐ | Question 7 | ☐ | ☑ | ☑ |
| Question 3 | ☐ | ☑ | Question 8 | ☑ | ☑ | ☐ |
| Question 4 | ☐ | ☑ | Question 9 | ☑ | ☐ | ☐ |
| Question 5 | ☑ | ☐ | Question 10 | ☐ | ☐ | ☑ |

METHOD AND SYSTEMS FOR COLLECTING USER'S CHOICES USING RFIDS

PRIORITY CLAIM

The present application claims priority to European Patent Application No. 05108935.7, filed Sep. 28, 2005.

DESCRIPTION

1. Field of the Invention

The present invention relates generally to the methods and systems for acquiring data from a huge number of sources and more specifically to a method and systems for wirelessly collecting data selected by a huge number of users in pre-filled forms, using RFIDs.

2. Background of the Invention

The collecting of choices performed by a huge number of users is a monumental task. For automating and simplifying such tasks, hand filled forms such as questionnaires for opinion surveys, voting cards, exam forms, or betting cards, are widely used. The acquisition of data is generally performed by the means of electromechanical machines, using mechanical and/or optical systems. For example, U.S. Pat. No. 5,610,383 discloses a device and method for collecting voting data, the device including a housing having a front face, back panel, opposite sides and a base, a visual character display, and a slot opening on the front face. A central processor within the housing stores data, including preprogrammed data and collected data in a primary memory, and controls operation of the components of the device, including a card reader. The card reader is structured to pull a ballot card through the slot opening for scanning data thereon, including votes cast by the voter, and transferring the scanned data to the central processor where the voting data is stored and tallied. The scanned ballot cards are deposited into a collection box within a locked interior of the housing. A bar code reader and/or a magnetic strip reader on the device reads encoded data on a voter's identification card, such as a voter registration number, so that the encoded data may also be transferred to the central processor for storage. A switch is responsive to removal of the ballot card collection box from within the housing to actuate a printer which prints a bar code on an adhesive backed label, wherein the bar code contains the ballot card tallies stored in the central processor. The label is attached to the collection box containing all submitted ballot cards and can be scanned by a bar code scanner to read and transmit the tallied votes to a host computer or central facility.

Figure 1:
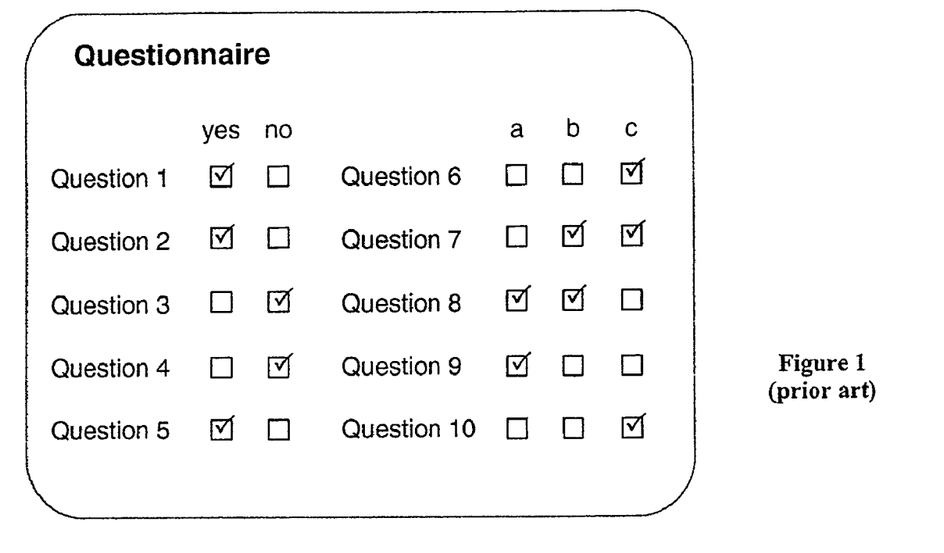
FIG. 1 illustrates an example of a typical pre-filled form.

FIG. 1 illustrates an example of a typical pre-filled form wherein questions, or references to questions, are printed and wherein a user has written his/her answers. For example, the user has answered 'yes' to the first and the second questions, 'no' to the third question and so on. According to the kind of forms, more than two choices can be provided and more than one answer can be done per question. For example, the user has answered 'b' and 'c' to the seventh question. Depending upon the kind of forms and the kind of the system used to collect the data, the user can write the answer with a standard pencil or make a hole. In the last case, the holes are generally pre-formed so as to make distinguishable holes according to a requested format.

Due to the mechanical and/or optical devices, the systems used to collect the data are complex and generally expensive. Furthermore, their reliability is not always sufficient. As a consequence, there is a need for a reliable method and systems for collecting data selected by a huge number of users in a pre-filled form.

SUMMARY OF THE INVENTION

Thus, it is a broad object of the invention to remedy the shortcomings of the prior art as described here above.

It is another object of the invention to provide a reliable method and systems for collecting data selected by a huge number of users in a pre-filled form.

It is a further object of the invention to provide a reliable method and systems for wirelessly collecting data selected by a huge number of users in a pre-filled form.

It is still a further object of the invention to provide a reliable method and systems for wirelessly controlling validity of used pre-filled forms.

The accomplishment of these and other related objects is achieved by a pre-filled form comprising an RFID tag and at least one check box, said check box comprising at least two electrical terminals electrically connected to said RFID tag, said RFID tag being adapted to respond differently according to the state of said check box, and by a method for collecting data from at least one form as described above, the method comprising the steps of, identifying the RFID tags;
selecting at least one of said identified RFID tags; and,
collecting the data of said selected RFID tags.

Further embodiments of the invention are provided in the appended dependent claims.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 3 comprises FIGS. 3a and 3b.

DETAILED DESCRIPTION OF THE PREFERRED EMBODIMENT

According to the invention, the pre-filled forms, or questionnaires, from which data are collected use the Radio Frequency Identifier (RFID) technology. This is done by embedding an RFID tag within the questionnaire and providing a mechanism for changing the RFID TAG response according to the answers selected by the user.

RFID Systems

The core of any RFID system is the 'Tag' or 'Transponder', which can be attached to or embedded within objects, wherein data can be stored. An RFID reader, generically referred to as reader in the following description, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require battery for transmission since generally, they are powered by the reader using an induction mechanism (an electromagnetic field is emitted by the reader antenna and received by an antenna localized on the RFID tag). This power is used by the RFID tag to transmit a signal back to the reader, carrying the data stored in the RFID tag. Active RFID tags comprise a battery to transmit a signal to a reader. A signal is emitted at a predefined interval or transmit only when addressed by a reader.

When a passive High Frequency (HF) RFID tag is to be read, the reader sends out a power pulse e.g., a 134.2 KHz power pulse, to the RFID antenna. The magnetic field generated is 'collected' by the antenna in the RFID tag that is tuned to the same frequency. This received energy is rectified and stored on a small capacitor within the RFID tag. When the power pulse has finished, the RFID tag immediately transmits back its data, using the energy stored within its capacitor as its power source. Generally, 128 bits, including error detection information, are transmitted over a period of 20 ms. This data is picked up by the receiving antenna and decoded by the reader. Once all the data has been transmitted, the storage capacitor is discharged, resetting the RFID tag to make it ready for the next read cycle. The period between transmission pulses is known as the 'sync time' and lasts between 20 ms and 50 ms depending on the system setup. The transmission technique used between the RFID tag and the reader is Frequency Shift Keying (FSK) with transmissions generally comprised between 124.2 kHz and 134.2 kHz. This approach has comparatively good resistance to noise while also being very cost effective to implement. Many applications require that RFID tag attached to objects be read while traveling at specific speeds by a readout antenna.

RFID tags can be read-only, write-once, or read-write. A read-only RFID tag comprises a read-only memory that is loaded during manufacturing process. Its content can not be modified. The write-once RFID tags differ from the read-only RFID tags in that they can be programmed by the end-user, with the required data e.g., part number or serial number. The read-write RFID tags allow for full read-write capability, allowing a user to update information stored in a tag as often as possible in the limit of the memory technology. Generally, the number of write cycles is limited to about 500,000 while the number of read cycles is not limited. A detailed technical analysis of RFID tag is disclosed e.g., in RFID (McGraw-Hill Networking Professional) by Steven Shepard, edition Hardcover.

Figure 2:
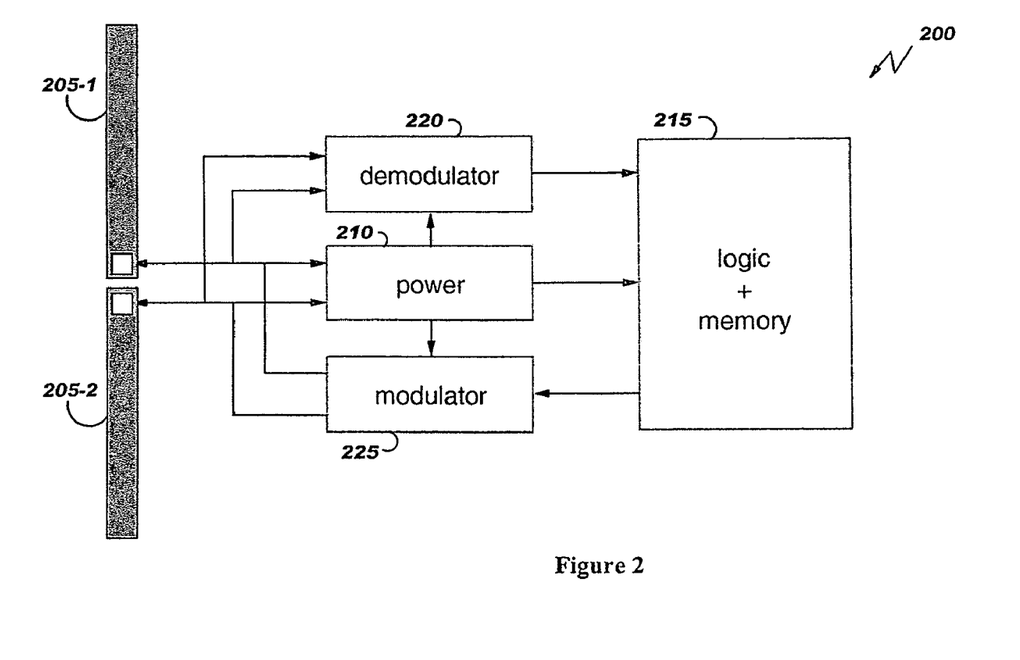
FIG. 2 depicts an example of the architecture of a passive RFID tag.

FIG. 2 depicts an example of the architecture of a passive HF or Ultra High Frequency (UHF) RFID tag 200. As shown, the dipole antenna comprising two parts 205-1 and 205-2 is connected to a power generating circuit 210 that provides current from received signal to the logic and memory circuit 215, to the demodulator 220, and to the modulator 225. The input of demodulator 220 is connected to the antenna (205-1 and 205-2) for receiving the signal and for transmitting the received signal to the logic and memory circuit 215, after having demodulated the received signal. The input of modulator 225 is connected to the logic and memory circuit 215 for receiving the signal to be transmitted. The output of modulator 225 is connected to the antenna (205-1 and 205-2) for transmitting the signal after it has been modulated in modulator 225.

The architecture of a semi-passive RFID tag is similar to the one represented on FIG. 2, the main difference being the presence of a power supply that allows it to function with much lower signal power levels, resulting in greater reading distances. Semi-passive tags do not have an integrated transmitter contrarily to active tags that comprise a battery and an active transmitter allowing them to generate high frequency energy and to apply it to the antenna.

As disclosed in "A basic introduction to RFID technology and its use in the supply chain", White Paper, Laran RFID, when the propagating wave from the reader collides with tag antenna in the form of a dipole, part of the energy is absorbed to power the tag and a small part is reflected back to the reader in a technique known as back-scatter. Theory dictates that for the optimal energy transfer, the length of the dipole must be equal to half the wave length, or $\lambda/2$. Generally, the dipole is made up of two $\lambda/4$ lengths. Communication from tag to reader is achieved by altering the antenna input impedance in time with the data stream to be transmitted. This results in the power reflected back to the reader being changed in time with the data i.e., it is modulated.

Figure 3A:
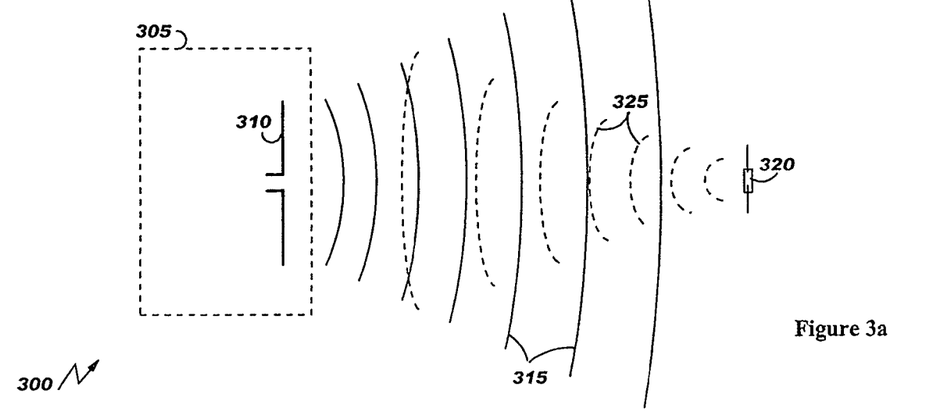
FIG. 3a shows an RFID system with a reader having an antenna and an RFID tag having a dipole antenna.
Figure 3B:
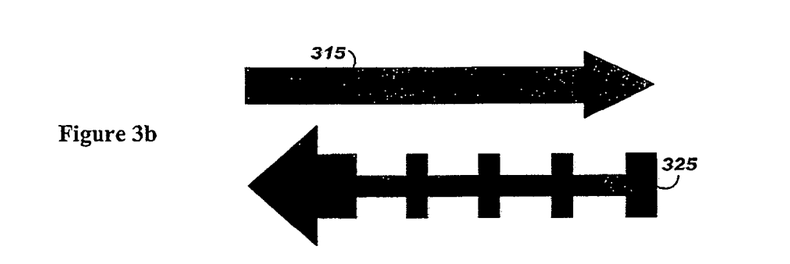
FIG. 3b illustrates the signal emitted by the antenna of the reader and the modulated signal reflected by the RFID tag.

FIG. 3, comprising FIGS. 3a and 3b, shows an RFID system 300. As depicted on FIG. 3a, RFID system 300 comprises a reader 305 having an antenna 310. The antenna 310 emits a signal 315 that is received by an RFID tag 320. Signal 315 is reflected in RFID tag 320 and re-emitted as illustrated with dotted lines referred to as 325. FIG. 3b illustrates the signal 315 emitted by the antenna 310 of the reader 305 and the signal 325 reflected by the RFID tag 320. As shown on FIG. 3b, the reflected signal 325 is modulated.

Pre-Filled Forms Embedding RFID Tags

Figure 4:
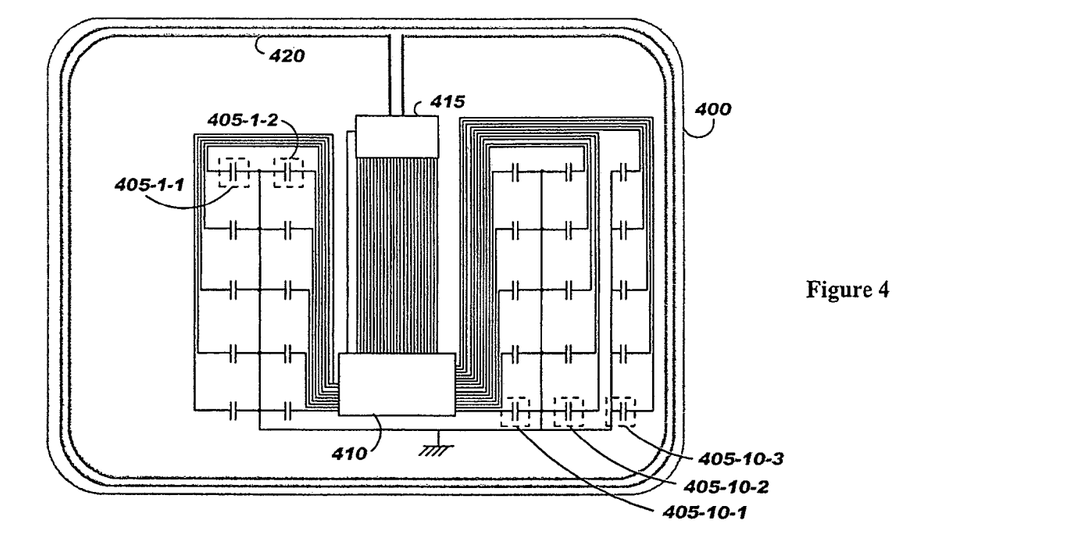
FIG. 4 illustrates an example of a pre-filled form embedding a particular implementation of the invention.

According to the invention the pre-filled forms are such that the RFID tag circuit e.g., a passive RFID tag circuit, is modified by the user's answers so that the RIFD tag response characterized his/her answers. Modifying the RFID tag circuit can be done by using pencils having conductive ink, by scraping the pre-filled form to remove conductive material, or any other known technique. Typically, a conductive ink comprises graphite or lead. FIG. 4 illustrates an example of a pre-filled form embedding a particular implementation of the invention. For sake of illustration, the shape and the questions of the pre-filled form of FIG. 4 is similar to the one of FIG. 1. In this example, the RFID tag circuit is modified by the user when answering the pre-filled form by using a pencil with conductive ink. Each check box of the pre-filled form comprises two electrical terminals that are electrically connected when the user checks the box. For example, each of the two check boxes 405-1-1 and 405-1-2, corresponding to the first question, comprises a pair of electrical terminals, as illustrated. Likewise, each of the three check boxes 405-10-1, 405-10-2, and 405-10-3, corresponding to the tenth question, comprises a pair of electrical terminals. One terminal of each check box is connected to a predetermined electrical level e.g., one terminal of each check box is connected to ground, while the second terminal of each check box is independently connected to a register 410. The register 410, preferably made of as many resistors as check boxes, is connected to a RFID tag. The RFID tag can be, for example, a standard 13 MHz passive tag that comprises a chip 415 and a coil antenna 420.

When accessed, the RFID tag embedded within the pre-filled form 400 transmits back the value of the register 410.

Figure 5:
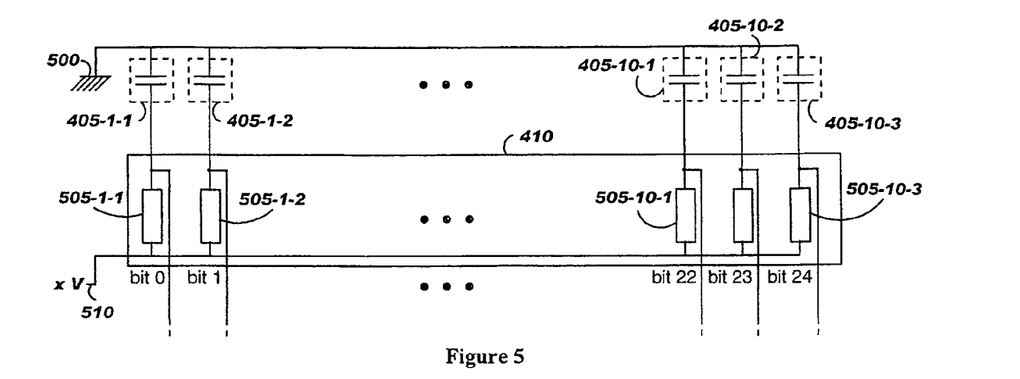
FIG. 5 depicts an example of the implementation of the register of FIG. 4.

FIG. 5 depicts an example of the implementation of the register 410. As mentioned above, the register 410 is connected to a first electrical terminal of each check box, generically referred to as 405, while the second electrical terminal of each check box is connected to a first electrical level e.g., ground 500. According to the implementation illustrated on FIG. 5, the register 410 comprises as many resistors as the number of check boxes, each resistor being associated to a different check box, and each resistor status representing a bit of the register. For example, resistor 505-1-1 is associated to check box 405-1-1 and corresponds to bit 0, resistor 505-1-2 is associated to check box 405-1-2 and corresponds to bit 1, and so on. A first electrical terminal of each resistor, generically referred to as 505, is connected to the first electrical terminal of a different check box 405, and the second electrical terminal of each resistor 505 is connected to a second electrical level e.g., x volts (x V), different than the first electrical level. The first electrical terminal of each resistor, characterizing the state of the associated check box, is electrically connected to the RFID tag chip 415. In a preferred embodiment, the electrical level x V is provided by the RFID tag chip when the RFID tag is interrogated.

Figure 6:
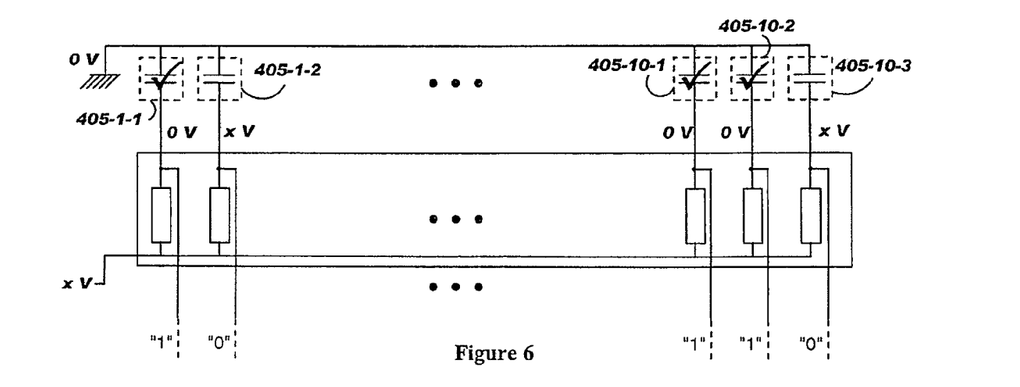
FIG. 6 depicts an example of the use of the register shown on FIG. 5.

FIG. 6 depicts an example of the use of the register 410 as shown on FIG. 5. According to this example, it is assumed that check boxes 405-1-1, 405-10-1, and 405-10-2 are checked while check boxes 405-1-2 and 405-10-3 are not checked. As a consequence, since the ink used for checking the boxes is electrically conductive, the electrical potential of both electrical terminals of check boxes 405-1-1, 405-10-1, and 405-10-2 are the same and equal to the first electrical level mentioned above i.e., the electrical potential of both electrical terminals of check boxes 405-1-1, 405-10-1, and 405-10-2 are set to the ground in this particular example. Likewise, since check boxes 405-1-2 and 405-10-3 are not checked, there is no electrical connection between their electrical terminals and so, both electrical terminals of the resistors 505-1-2 and 505-10-3 are at the same electrical level i.e., x Volts. For sake of illustration it is assumed that an electrical level corresponding to x Volts means a bit equal to "0" and that an electrical level corresponding to 0 Volts (ground) means a bit equal to "1". Therefore, the bit value associated to the check boxes 405-1-1, 405-10-1, and 405-10-2, that are checked, is "1" and the bit value associated to the check boxes 405-1-2 and 405-10-3, that are not checked, is "0". As mentioned above, this register status is accessed by the RFID tag chip that is adapted to transmit this status.

Alternatively, the register 410 may comprise a more complex circuitry for optimizing pre-filled form wiring and power consumption. In particular, for reducing the number of wires between the register and the RFID tag chip, a serializer and a deserializer devices can be used.

In a preferred embodiment, each RFID tag contains a unique tag identifier (ID) allowing to determine whether or not data associated to the form having a particular ID has been collected. Depending upon the implementation, the form ID of the forms where data have been collected can be stored by the RFID reading device, or by another device linked to the RFID reader, so as to avoid a future reading or the form ID can be erased, so that the form is no longer usable.

Whereas the description of the pre-filled forms according to the invention is based upon the use of conductive ink in the previous paragraphs, other techniques can be used, as mentioned above.

Systems for Collecting Data

The system of the invention is particularly adapted for collecting data from a huge number of persons using few pre-filled form shapes and so, this system is convenient for questionnaires for opinion surveys, voting cards, exam forms, or betting cards. In such cases, pre-filled forms are distributed to the people and one or more card readers are used for collecting the data once the forms have been fulfilled.

Figure 7:
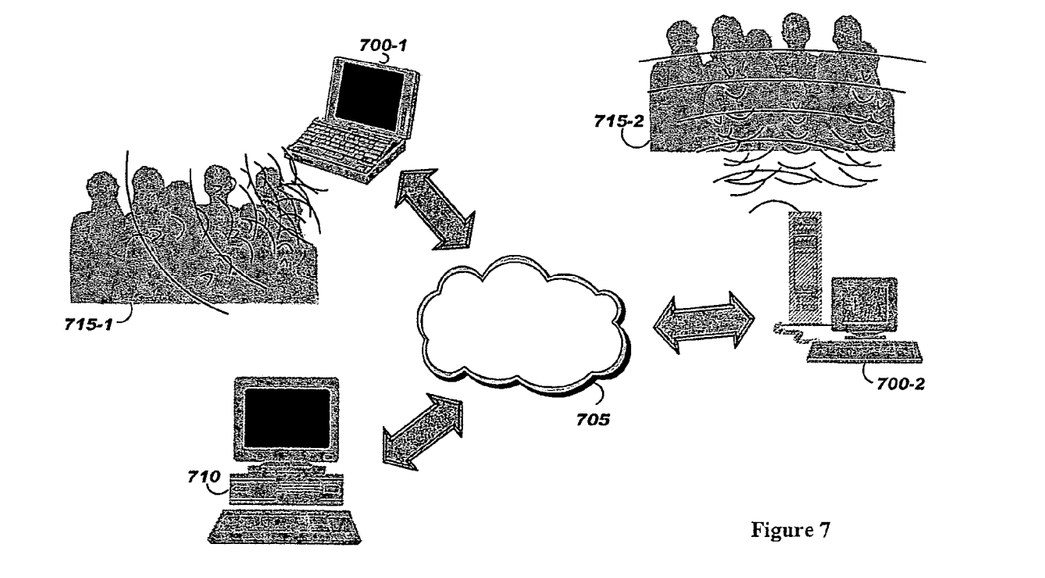
FIG. 7 shows an environment wherein the invention is implemented for applications like opinion surveys, voting, exams, or betting.

FIG. 7 shows an environment wherein the invention is implemented for such kind of applications. As illustrated, the system comprises a plurality of data processing devices referred to as 700 linked to a data network 705. For sake of illustration, a RFID reader is embedded within each data processing devices 700. A dedicated data processing device 710 is used to centralise all the information collected by the data processing devices 700 embedding RFID readers. When users, generically referred to as 715 on FIG. 7, carrying pre-filled form according to the invention, are located within the reading range of a RFID reader embedded within a data processing device 700, the data processing device 700 checks whether or not the data contained in the forms have already been collected or not, by checking the form identifiers, as explained above. If the data have not been collected, the data processing device 700 collects the data, stores the form identifiers, or erases the form identifiers on the forms, and transmits the collected data to the dedicated data processing device 710.

Figure 8:
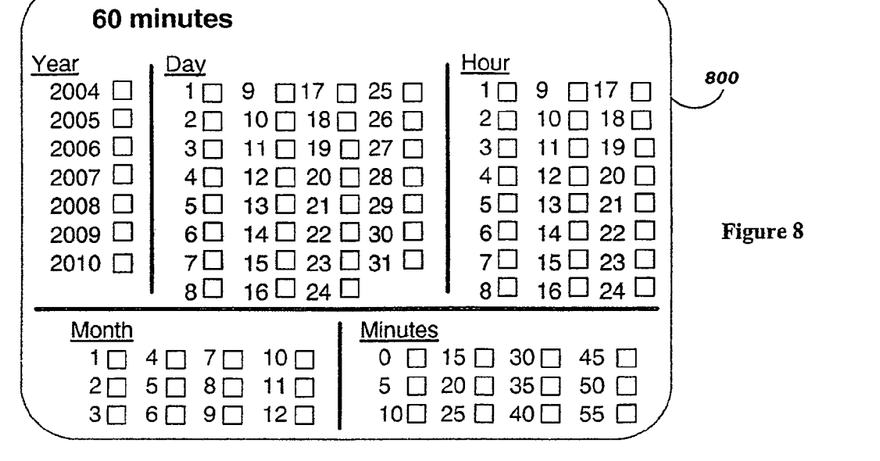
FIGS. 8 and 9 illustrate an example of the implementation of the invention for controlling payment of parking meters.

In another embodiment, the invention is used for controlling payment of parking meters. According to this application, pre-filled forms corresponding to different parking time periods are available at costs depending upon the parking duration, for an immediate use or a future use. In a preferred embodiment, the time duration associated to a pre-filled form is encoded within the RFID tag so that its value can be accessed from an RFID reader. An example of such form is illustrated on FIG. 8. When the pre-filled form 800 is used, the user checks the boxes corresponding to the date and time at which the vehicle has been parked so that any qualified person can control parking payment by comparing these date and time with the authorized parking duration associated with the form, and the current date and time. According to the invention, the identification of the checked boxes can be accessed through the RFID tag. Thus, even if a visual inspection can be done, an automatic control can also be done by a RFID reader located near the parking places, or by driving around parked vehicles with a vehicle equipped with an RFID reader.

Figure 9:
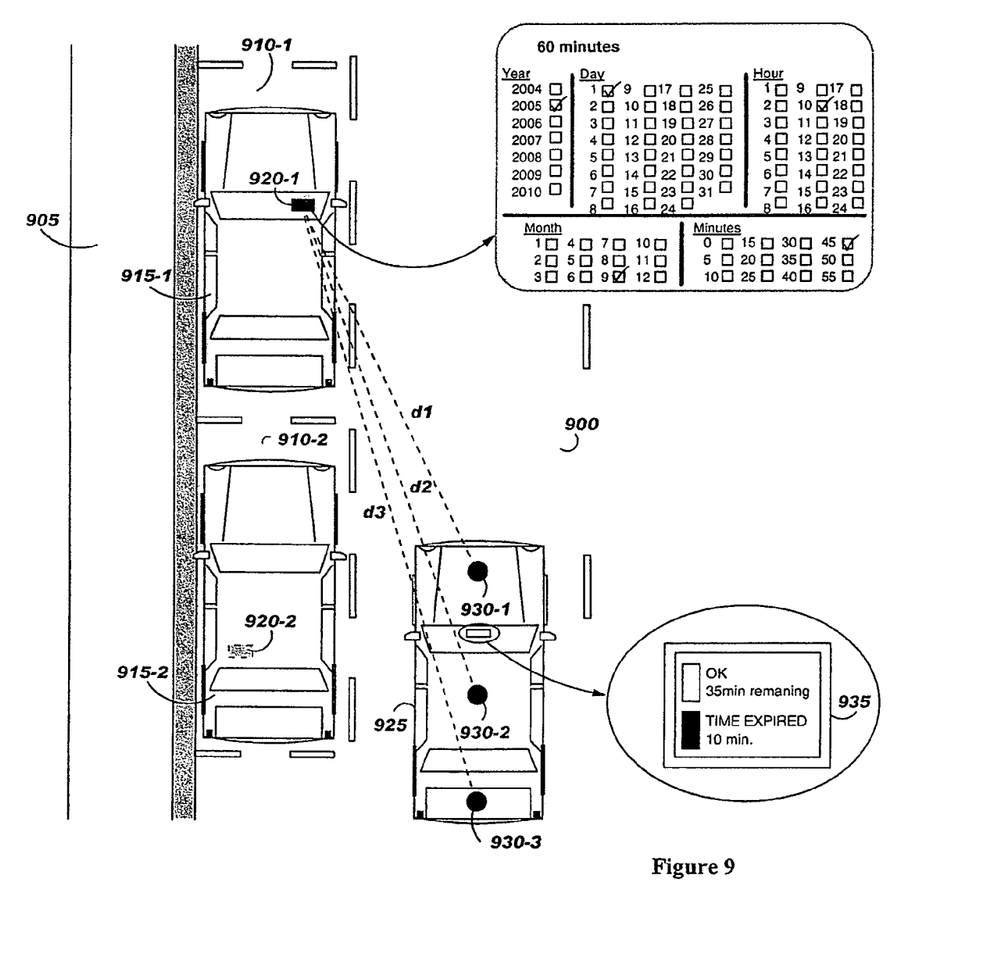

FIG. 9 depicts an example of the control of parking meter payment done with a vehicle equipped with an RFID reader. As illustrated, a street 900 comprises a sidewalk 905 and a plurality of parking places 910-1 and 910-2 where vehicles 915-1 and 915-2 are parked, respectively. For sake of illustration, each vehicle driver has left a pre-filled form for paying parking meter is each vehicle, pre-filled form 920-1, located in vehicle 915-1, is visible from outside the vehicle while pre-filled form 920-2, located in vehicle 915-2, is not visible from outside the vehicle. Still for sake of illustration, it is assumed that form 920-1 corresponds to a 60 minutes validity ticket and indicates Jan. 9, 2005, 10:45 am, as shown on the drawing, form 920-2 corresponds to a 45 minutes validity ticket and indicates Jan. 9, 2005, 10:15 am, and that current time is Jan. 9, 2005, 11:10 am.

A vehicle 925 for controlling payment of parking meters is equipped with an RFID reader having three antennas 930-1, 930-2, and 930-3. Antennas 930-1, 930-2, and 930-3 are positioned at different locations so that the distances between a RFID tag and these antennas are different one to each others. As mentioned above, communication from tag to reader is achieved by altering the antenna input impedance in time with the data stream to be transmitted. This results in the power reflected back to the reader being changed in time with the data i.e., it is modulated. As a consequence, the distance between the reader and the tag can be estimated by determining the time requires for the signal to be received by the reader after being emitted.

When controlling the payment of the parking meters, the vehicle 925 identifies all the RFID tags, accesses the data and simultaneously determines the location of the RFID tags. The controlling vehicle does not need to be stopped. The accessed data comprise the checked boxes identifiers and the time duration associated to the form. The localisation of an RFID tag is done by determining the distances between this RFID tag and the three RFID reader antennas. The position of the RFID tag corresponds to the intersection of the three circles having the RFID reader antennas as center and the associated distances to the RFID tag as radius. The parking meter payment is valid if the date and time determined by the check boxes to which the duration associated to the form is added is a future date and time (compared with the date and time at which the control is done). The result of the payment control can be displayed as illustrated on screen 935 wherein it is shown the status of the payment and the position of the associated vehicle. For example, when the vehicle 925 receives the data "Jan. 9, 2005, 10:45 am" and "60 minutes" from the form 920-1, it determines the expiration date and time of the parking meter, which is Jan. 9, 2005, 11:45 am, and then, it compares this date and time with the current date and time (Jan. 9, 2005, 11:10 am), and it concludes that payment is OK and that payment is still valid for the 35 next minutes.

As mentioned above, passive RFID tags gather all the necessary energy from the reader's signal while semi-passive RFID tags contain an integrated power source allowing to be less dependent from the energy gathered from the reader. As a consequence, semi-passive RFID tags provide an increased reading range. The use of power source in semi-passive RFID tags does not increase excessively the cost of the tags. However, if standard power supply can not be easily integrated to pre-filled form as described above, it exists particular power source that can be used in conjunction with such pre-filled forms, where the power source is directly printed on the material. For example, Power Paper Ltd. has developed, and purpose for commercial use, ultra-thin and flexible, environment friendly energy cells. Using this technology, it is possible to print the power source on the pre-filled form so as to use semi-passive RFID tag allowing greater reading distances.

Naturally, in order to satisfy local and specific requirements, a person skilled in the art may apply to the solution described above many modifications and alterations all of which, however, are included within the scope of protection of the invention as defined by the following claims.

What is claimed is:

1. A pre-filled form comprising an RFID tag and at least one check box, said check box comprising at least two electrical terminals electrically connected to said RFID tag, said RFID tag being adapted to generate data corresponding to a state of said check box.

2. The pre-filled form of claim 1 further comprising a register, said register interfacing said RFID tag and said at least two electrical terminals of said at least one check box.

3. The pre-filled form according to claim 2 wherein said register comprises at least one resistor having two electrical terminals, a first electrical terminal being connected to a first electrical level, the second electrical terminal being connected to one of said at least two electrical terminals of said check box, a second of said at least two electrical terminals of said check box being connected to a second electrical level.

4. The pre-filled form according to claim 1 wherein said RFID tag is a semi-passive RFID tag.

5. The pre-filled form of claim 4 wherein the power source is directly printed on said pre-filled form.

6. A method for collecting data from a plurality of forms, each form including an RFID tag and at least one check box, said at least one check box comprising at least two electrical terminals electrically connected to said RFID tag, said RFID tags of said plurality of forms each being adapted to generate data according to the state of said at least one check box of its respective form, the method comprising the steps of:

identifying the RFID tags of the plurality of forms;

selecting at least one of said identified RFID tags as a set of selected tag(s); and collecting the generated data of said set of selected tag(s).

7. The method of claim 6 wherein each of the RFID tags includes an identifier, the method further comprising the step of memorizing the identifiers of said set of selected tag(s).

8. The method of claim 6 wherein each of the RFID tags includes an identifier, the method further comprising the step of erasing the identifiers of said set of selected tag(s).

9. The method of anyone of claim 6 further comprising the step of locating forms corresponding to said set of selected tag(s).

10. The method of claim 6 wherein the method is implemented within a service provider server.

11. An apparatus for collecting data from a plurality of forms, each form including an RFID tag and at least one check box, said at least one check box comprising at least two electrical terminals electrically connected to said RFID tag, said RFID tags of said plurality of forms each being adapted to generate data according to the state of said at least one check box of its respective form, the apparatus comprising:

means for identifying the RFID tags of the plurality of forms;

means for selecting at least one of said identified RFID tags as a set of selected tag(s); and means for collecting the generated data of said set of selected tag(s).

12. The apparatus of claim 11 wherein each of the RFID tags includes an identifier, the apparatus further comprising means for memorizing the identifiers of said set of selected tag(s).

13. The apparatus of claim 11 wherein each of the RFID tags includes an identifier, the apparatus further comprising means for erasing the identifiers of said set of selected tag(s).

14. The apparatus of claim 11 further comprising means for locating forms corresponding to said set of selected tag(s).

15. The apparatus of claim 11 wherein the apparatus is adapted for implementation within a service provider server.

16. A computer program stored on a computer readable medium for collecting information from a plurality of pre-filled forms respectively including at least one RFID tag and at least one check box, each respectively check box including at least two electrical terminals electrically connected to said respective RFID tag, said respective RFID tag being adapted to generate data according to a state of said respective check box, said computer program comprising:
- computer readable instructions stored on the medium for identifying the RFID tags;
- computer readable instructions stored on the medium for selecting at least one of said identified RFID tags; and
- computer readable instructions stored on the medium for collecting the data of said selected RFID tags.

17. The computer program of claim 16 further comprising computer readable instructions stored on the medium for memorizing the identifiers of said selected RFID tags.

18. The computer program of claim 16 further comprising computer readable instructions stored on the medium for erasing the identifiers of said selected RFID tags.

19. The computer program of claim 16 further comprising computer readable instructions stored on the medium for locating said selected RFID tags.

20. The computer program of claim 16 wherein the computer program is adapted for implementation within a service provider server.

* * * * *